United States Patent
Srivastav et al.

(10) Patent No.: US 11,509,675 B2
(45) Date of Patent: Nov. 22, 2022

(54) SYSTEMS AND METHODS FOR CYBER MONITORING AND ALERTING FOR CONNECTED AIRCRAFT

(71) Applicant: Honeywell International Inc., Morris Plains, NJ (US)

(72) Inventors: Amit Srivastav, Hyderabad (IN); Rajesh Chenchu, Tirupati (IN); Nayyar Azam Khan Rao, Bangalore (IN); Phani Ammi Raju Pothula, Peravali (IN); Vijayshankaran Iyer, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 195 days.

(21) Appl. No.: 17/097,558

(22) Filed: Nov. 13, 2020

(65) Prior Publication Data
US 2022/0103578 A1  Mar. 31, 2022

(30) Foreign Application Priority Data
Sep. 25, 2020  (IN) .............................. 202011041660

(51) Int. Cl.
*H04L 9/40*  (2022.01)
*H04L 67/12*  (2022.01)
(Continued)

(52) U.S. Cl.
CPC ......... *H04L 63/1425* (2013.01); *G06N 20/00* (2019.01); *H04L 41/16* (2013.01);
(Continued)

(58) Field of Classification Search
CPC ... H04L 63/1425; H04L 41/16; H04L 43/045; H04L 63/0236; H04L 63/1433;
(Continued)

(56) References Cited

U.S. PATENT DOCUMENTS 9,338,175 B1 * 5/2016 Ramos ................ H04L 63/1408
10,142,365 B2  11/2018 Grubel et al.
(Continued)

*Primary Examiner* — El Hadji M Sall
(74) *Attorney, Agent, or Firm* — Bookoff McAndrews PLLC

(57) ABSTRACT

A method of monitoring network traffic of a connected vehicle. The method includes receiving network traffic information from a vehicle gateway, the network traffic information including malicious and/or benign information. The method also includes storing the network traffic information on a data server and periodically updating the network traffic information stored on the data server. The method further includes: pre-processing the network traffic information, the pre-processing the network traffic information including filtering and normalizing the network traffic information; generating a learning model based on the pre-processed network traffic information, the learning model being generated by an artificial intelligence learning; updating the learning model based on additional network traffic information, the additional network traffic information including real-time network data; in accordance with the updated learning model, detecting an anomaly event in the incoming network data; and generating a notification and/or blocking one or more packets associated with the incoming network data.

20 Claims, 7 Drawing Sheets

(51) Int. Cl.
*H04L 43/045* (2022.01)
*G06N 20/00* (2019.01)
*H04L 41/16* (2022.01)

(52) U.S. Cl.
CPC ........ *H04L 43/045* (2013.01); *H04L 63/0236* (2013.01); *H04L 63/1433* (2013.01); *H04L 67/12* (2013.01)

(58) Field of Classification Search
CPC ..... H04L 67/12; H04L 41/145; H04L 41/147; H04L 43/026; H04L 43/028; H04L 2463/146; H04L 63/0245; H04L 63/1416; G06N 20/00
See application file for complete search history.

(56) References Cited

U.S. PATENT DOCUMENTS

| | | | |
|---|---|---|---|
| 10,235,523 | B1 | 3/2019 | Keller, III et al. |
| 10,991,242 | B2 * | 4/2021 | Taylor ..................... H04Q 9/00 |
| 11,063,472 | B1 * | 7/2021 | Ashrafi ................... G06F 17/11 |
| 2016/0112445 | A1 * | 4/2016 | Abramowitz ....... H04L 63/1466 726/23 |
| 2019/0190926 | A1 | 6/2019 | Choi et al. |
| 2020/0067955 | A1 * | 2/2020 | Hass .................. H04L 12/4625 |
| 2020/0159624 | A1 * | 5/2020 | Malkov ................. G06N 20/00 |

* cited by examiner

SYSTEMS AND METHODS FOR CYBER MONITORING AND ALERTING FOR CONNECTED AIRCRAFT

CROSS-REFERENCE TO RELATED APPLICATION(S)

This application claims the benefit of priority under 35 U.S.C. § 119 to Indian Provisional Patent Application No. 202011041660, filed Sep. 25, 2020, which is incorporated herein by reference in its entirety.

TECHNICAL FIELD

Various embodiments of the present disclosure relate generally to the field of connected vehicles and, more particularly, to systems and methods for improving cyber monitoring of connected vehicles using cloud-based learning models.

BACKGROUND

With increasing cybersecurity disasters, concerns regarding infrastructure security have risen significantly among various organizations and businesses. Many organizations and businesses interested in strengthening their security infrastructure often seek third-party cyber-threat intelligence solutions. However, in general, third-party cyber-threat intelligence solutions do not operate in real-time and usually require significant human involvements, as well as being cost prohibitive. Further, in order for organizations and businesses to fully understand impending threats, Security Operation Center (SOC) and Incident Response (IR) teams are often implemented to measure the severity of threats, which requires time, resources and money. As such, there is an ongoing need in the cybersecurity industry to respond to cyberattacks in real-time with minimal human interaction, and a need for autonomous solutions is on the rise.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for improving the efficiency of navigation data management systems or Flight Management Systems through a distributed data acquisition process.

In one embodiment, a method of monitoring network traffic of a connected vehicle is disclosed. The method may include: receiving network traffic information from a vehicle gateway, the network traffic information including malicious and/or benign information; storing the network traffic information on a data server and periodically updating the network traffic information stored on the data server; pre-processing the network traffic information stored on the data server, the pre-processing the network traffic information including filtering and normalizing the network traffic information; generating a learning model based on the pre-processed network traffic information, the learning model being generated by an artificial intelligence learning; updating the learning model based on additional network traffic information, the additional network traffic information including real-time network data; in accordance with the updated learning model, detecting an anomaly event in incoming network data; and in accordance with detecting the anomaly event in the real-time network data, generating a notification and/or blocking one or more packets associated with the incoming network data.

In accordance with another embodiment, a computer system for monitoring network traffic of a connected vehicle is disclosed. The computer system may include: a memory storing instructions; and one or more processors configured to execute the instructions to perform operations. The operations may include: receiving network traffic information from a vehicle gateway, the network traffic information including malicious and/or benign information; storing the network traffic information on a data server and periodically updating the network traffic information stored on the data server; pre-processing the network traffic information stored on the data server, the pre-processing the network traffic information including filtering and normalizing the network traffic information; generating a learning model based on the pre-processed network traffic information, the learning model being generated by an artificial intelligence learning; updating the learning model based on additional network traffic information, the additional network traffic information including real-time network data; in accordance with the updated learning model, detecting an anomaly event in incoming network data; and in accordance with detecting the anomaly event in the incoming network data, generating a notification and/or blocking one or more packets associated with the incoming network data.

In accordance with another embodiment, a non-transitory computer-readable medium storing instructions that, when executed by one or more processors of a computer system, cause the computer system to perform a method of monitoring network traffic of a connected vehicle is disclosed. The method may include: receiving network traffic information from a vehicle gateway, the network traffic information including malicious and/or benign information; storing the network traffic information on a data server and periodically updating the network traffic information stored on the data server; pre-processing the network traffic information stored on the data server, the pre-processing the network traffic information including filtering and normalizing the network traffic information; generating a learning model based on the pre-processed network traffic information, the learning model being generated by an artificial intelligence learning; updating the learning model based on additional network traffic information, the additional network traffic information including real-time network data; in accordance with the updated learning model, detecting an anomaly event in incoming network data; and in accordance with detecting the anomaly event in the incoming network data, generating a notification and/or blocking one or more packets associated with the incoming network data.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that avionics data may be retrieved efficiently from legacy and resource constrained platforms though a distributed data acquisition process.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
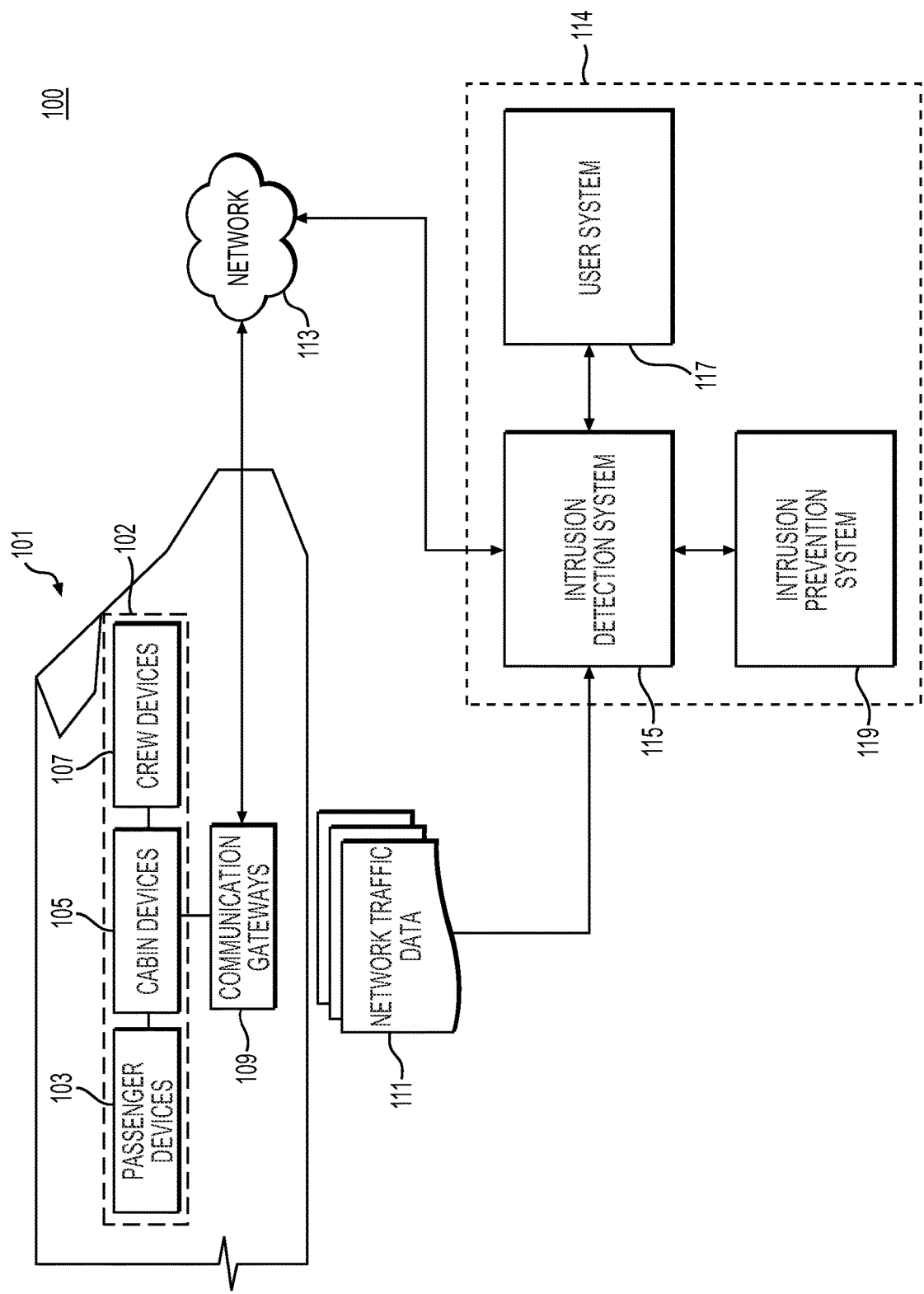
FIG. 1 depicts an overview of an example environment in which systems, methods, and other aspects of the present disclosure may be implemented.

The following embodiments describe systems and methods for improving connected vehicle network traffic monitoring. As described above, there is a need in the cybersecurity industry to respond to cyberattacks in real-time and autonomously with little or no human interaction. Particularly, in connected aircraft environments, due to the possibility of increased cybersecurity disasters, there is a demand for real-time and autonomous network health or performance monitoring as well as diagnostic operations to ensure that the network data that is transferred between ground systems and various data sources on aircrafts are safely communicated via aircraft data gateways.

Accordingly, the following embodiments describe systems and methods for monitoring network traffic of connected vehicles using a cloud-based learning model. According to certain aspects of the present disclosure, an intrusion detection system may build or generate an anomaly prediction model from the network traffic data received from a connected vehicle. The anomaly prediction model may be built and continuously updated using a cloud-based artificial intelligence (AI) (e.g., machine learning) based on real-time and/or stored network traffic data. Further, the anomaly prediction model may be deployed in various end-user systems or devices to detect and prevent potential cyberattacks in real-time. The intrusion detection system utilizing the cloud-based anomaly prediction model may provide alerts and/or reports when anomalies are detected in the real-time or stored network traffic data.

As described in further detail below, providing the intelligent, connected vehicle network traffic monitoring capabilities utilizing cloud-based anomaly prediction model in accordance with the present disclosure will result in improvements in connected vehicle cybersecurity technology in various aspects. The present disclosure allows various users to monitor and be provided with alerts for connected vehicle network health in real-time using cloud services autonomously. The present disclosure reduces additional resources, time, and money compared to the conventional cybersecurity monitoring technology that depends on third party solutions (e.g., cyber security analysts and specialists) which require significant human involvements that are costly.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an overview of an example environment according to one or more embodiments of the present disclosure. In one embodiment, the example environment is a connected environment 100 including one or more connected vehicles. The one or more connected vehicles may include, for example, a connected aircraft 101. Alternatively or additionally, the one or more connected vehicles may include motor vehicles, railed vehicles, amphibious vehicles, and spacecraft. In one embodiment, the connected aircraft 101 receives and transmits network data to and from a network 113 via network towers, satellites, satellite stations, cellular network, other connected aircraft equipped with communication gateways, or any other suitable communication media. The network data may be transferred to and from ground systems 114 via the network 113. In one embodiment of the connected environment 100, the ground systems 114 include, an intrusion detection system 115, an intrusion prevention system 119, and a user system 117.

As shown in FIG. 1, the connected aircraft 101 may include a connected aircraft network 102. In one embodiment, the connected aircraft network 102 includes and enables communication between, for example, passenger devices 103 (e.g., smartphones, laptops, tablets, etc.), cabin devices 105, crew devices 107, and one or more communication gateways 109. The one or more communication gateways 109 may include an aircraft communication gateway. The passenger devices 103 may communicate with In-flight Entertainment (IFE) and communication systems via Global Systems for Mobile Communications (GSM), Universal Serial Bus (USB), Wi-Fi, and/or other suitable electrical cables or wireless communication channel. The cabin devices 105 may communicate with Airline Information Systems (AIS) via Wi-Fi and/or other electrical cables or wireless communication channels. The crew devices 107 may communicate with Aircraft Control Systems (ACS) via Wi-Fi, General Packet Radio Service (GPRS), and/or other suitable electrical cables or wireless communication channels. The ACS, AIS, AOS, and IFE systems may communicate with each other through Aeronautical Radio Incorporated (ARINC) Services. Further, the passenger devices 103, the cabin devices 105, and the crew devices 107 may communicate with Air Traffic Systems (ATS), Airline Operational Systems (AOS), other aircrafts, satellites, airports, airlines, manufacturers, and/or various third parties through very high frequency (VHF), satellite communications (SATCOM), GateLink, Global Positioning System (GPS), GPRS, Registered Jack-45 (RJ-45), Wi-Fi, and/or USB signals.

In one embodiment, the passenger devices 103, the IFE systems, the cabin devices 105, the AOS, the crew devices 107, and the ACS communicate with ground networks, through the one or more communication gateways 109, for example, Aeronautical Telecommunication Network/Internet Protocol Suite (ATN/IPS) routers with Quality of Service (QoS) capabilities on the aircraft 101. The one or more communication gateways 109 may route connected aircraft network 102 data to and from the network 113 through access terminals (not shown in the figures). The one or more communication gateways 109 may receive and transmit, for example, Aircraft Standard Communication Bus (ASCB) data, Wi-Fi data, Local Area Network (LAN) data, and ARINC data to and from the connected aircraft network 102. Further, the one or more communication gateways 109 may use firewall mechanisms, for example, Security Proxy and Security Manager Modules, to prevent incoming network data packets with potentially threatening characteristics by negotiating and establishing secure communication between the ground networks and the passenger devices 103, the cabin devices 105, and the crew devices 107. In one embodiment, separate gateways (e.g., ATN/IPS routers) may be provided to the cabin and cockpit operations systems on the aircraft 101 to reduce potential cyberattacks to the cabin and cockpit operations systems. In one embodiment, the one or more communication gateways 109 is an intermediate communication gateway arranged between the onboard systems of the connected aircraft 101 and the ground systems 114, for example, the intrusion detection system 115, the intrusion prevention system 119, and the user system 117 (e.g., smartphones, personal computers, tablets, servers, etc.). In one embodiment, the intrusion prevention system 119 includes a firewall mechanism, for example, a signature-based prevention mechanism that searches for a known network data identity or pattern stored in a signature database at a host or end-user system level. Additionally, the intrusion prevision system 119 may compare the network traffic data 111 received from the connected aircraft 101 against the identities and patterns stored in the signature database in order detect known cybersecurity threats. However, a conventional signature-based firewall prevention mechanism may be unable to identify unknown threats that are not present in the signature database.

Referring back to FIG. 1, according to one or more embodiments of the present disclosure, the aircraft 101 may downlink network traffic data 111, via the one or more communication gateways 109 (e.g., Aircraft Data Gateways), to the intrusion detection system 115. The downlink of the network traffic data 111 may be performed while the connected aircraft 101 is in-air or grounded, and in real-time or asynchronously. The network traffic data 111 may include data packets containing network routing information. The network routing information may include, for example, source addresses, source port numbers, destination port numbers, communication protocols, and destination units (e.g., a Flight Management Computer (FMC), Electronic Flight Bag (EFB), etc.). The network routing information in the network traffic data 111 may also include network connection log data of the one or more communication gateways 109. The network connection log data may include, for example, cockpit system hardware unit port numbers, aircraft device unit numbers, channel numbers, and bus information (e.g., ARINC and ASCB data).

In one embodiment, the connected aircraft network 102 data are authenticated, authorized, and accounted by using, for example, a Wi-Fi Protected Access 2 (WPA2) method. Further, the connected aircraft network 102 data may be encrypted and decrypted by using Aircraft Gateway security software. Furthermore, Hypertext Transfer Protocol Secure (HTTPS), Secure Sockets Layer/Transport Layer Security (SSL/TLS), Virtual Private Network (VPN) protocols may be utilized as security protocols for processing and communicating the connected aircraft network 102 data to and from the ground network.

In one embodiment, the network traffic data 111 of the connected aircraft 101 may be periodically downloaded and stored into data servers 203 (later shown in FIG. 2) of the ground systems 114 to train and build a learning-based prediction model 206 (later shown in FIG. 2) for analyzing and monitoring the network traffic data 111. The prediction model 206 is configured to detect and prevent potential cyberattacks, and enables alerts and/or reports when a threat of attack to the connected aircraft network 102 is identified by the prediction model 206. Further, the prediction model 206 is configured to identify known or unknown and complex threat patterns in the network traffic data 11.

As indicated above, FIG. 1 is provided merely as an example. Alternative examples are possible and may differ from what was described with regard to FIG. 1. For example, other connected vehicles, such as motor vehicles, railed vehicles, watercraft, etc. may be incorporated, additionally or alternatively, similar to the connected aircraft 101 in the connected environment 100. In some embodiments, automobiles, railed vehicles, watercraft, and/or other systems or devices may provide network traffic data to the intrusion detection system 115 to build and run learning-based prediction models. The number and arrangement of devices, systems, and networks shown in FIG. 1 are provided as an example. In practice, there may be additional devices, fewer devices, systems and/or networks, different devices, systems and/or networks, or differently arranged devices, systems, and/or networks than those shown in FIG. 1.

Figure 2:
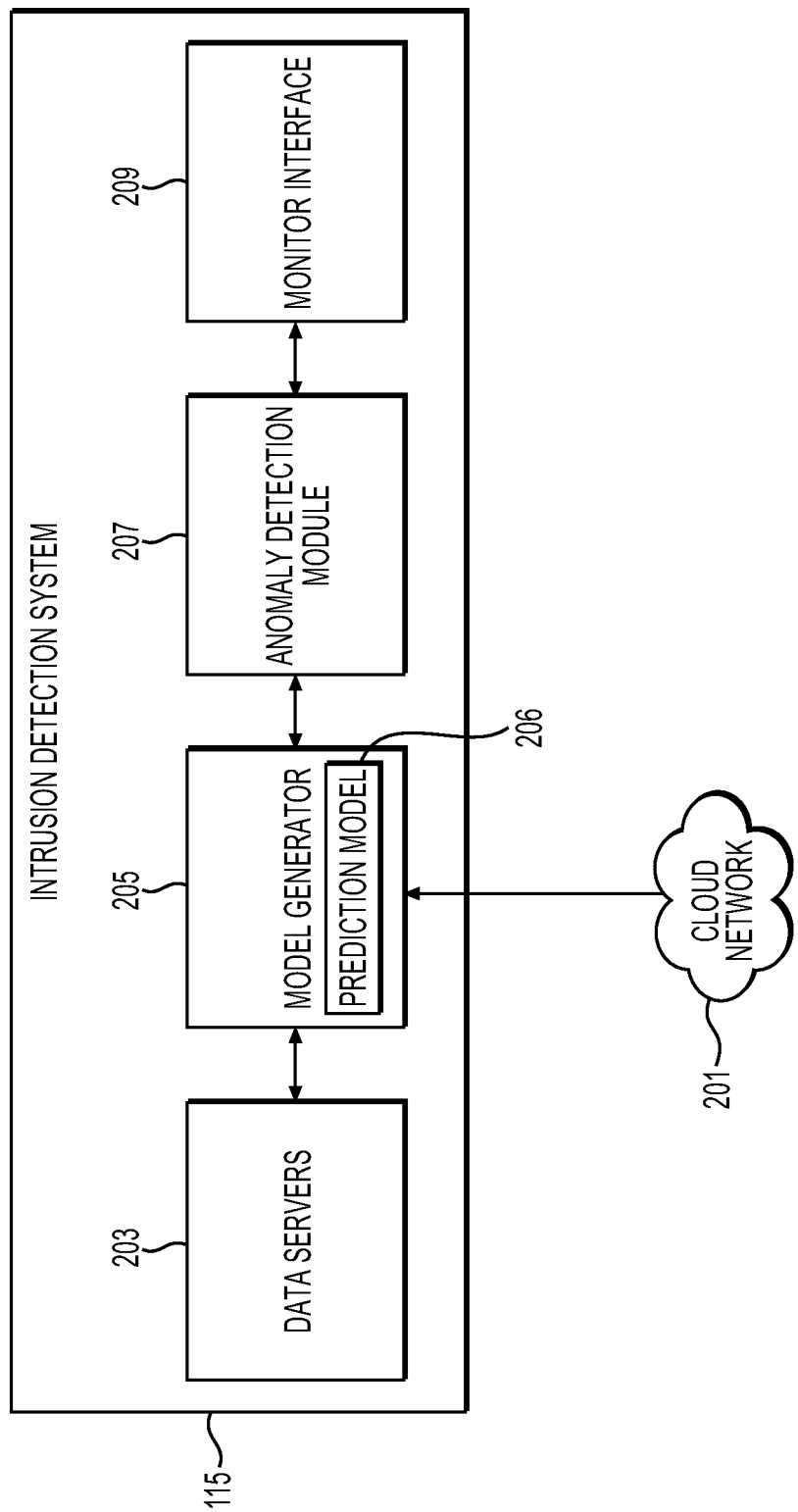
FIG. 2 depicts a block diagram schematically showing an example intrusion detection system for network traffic monitoring, according to one or more embodiments.

FIG. 2 depicts a block diagram schematically showing an example intrusion detection system 115 for building the prediction model 206 and detecting anomalies and unknown patterns in the network traffic data 111, according to one or more embodiments. In one embodiment, the prediction model 206 is a network traffic anomaly detection model. As shown in FIG. 2, the intrusion detection system 115 may include one or more data servers 203, a model generator 205, an anomaly detection module 207, and a monitor interface 209. The intrusion detection system 115 may be connected to or implemented on a cloud network 201. In some embodiments, the one or more data servers 203 are located on the cloud network 201 or located remotely from the intrusion detection system 115. The components, devices, and modules of the intrusion detection system 200 may include physical circuitry and processors that may be interconnected via wired connections, wireless connections, or a combination of wired and wireless connections.

In one embodiment, the intrusion detection system 115 is configured to receive the network traffic data 111 from the connected aircraft 101 as shown in FIG. 1 and store the network traffic data 111 in the one or more data servers 203. The network traffic data 111 may be continuously or periodically stored in the one or more data servers 203. In one embodiment, the model generator 205 is configured to access the stored network traffic data 111 for training and generating the prediction model 206 based on the stored network traffic data 111. The model generator 205 may continuously or periodically monitor the network traffic data 111 stored in the data servers 203 to train and generate the prediction model 206. In one embodiment, the prediction model 206 may be trained and generated by artificial intelligence (AI) (e.g., machine learning) techniques (or algorithms) provided in the cloud network 201. The machine learning techniques of the present disclosure may include deep learning algorithms or techniques. In one embodiment, once the prediction model 206 is generated, the prediction model 206 may be trained using the previously stored historical network traffic data 111 and/or newly stored network traffic data 111 received from the aircraft 101 in real-time. In addition, the prediction model 206 may be updated using the network traffic data 111 received in the data servers 203 in real-time. In one embodiment, the prediction model 206 is re-trained (i.e., updated) at periodic intervals or continuously in real-time based on the newly stored network traffic data 111.

In one embodiment, the prediction model 206 may be generated though a pre-processing phase and a training phase. During the pre-processing phase, the model generator 205 may analyze network data samples that contain labeled malicious and benign files or records. The model generator 205 may filter and normalize the network data samples before the training in the pre-processing phase. Further, during the training phase, the model generator 205 may train the prediction model 206 using historical malicious and benign connection log files or records. Thus, the output of the training phase is the prediction model 206. The training process may be performed on a cloud network to reduce training time.

The prediction model 206 generated using machine learning techniques may be fully autonomous and detect unknown attacks because the machine learning algorithm understands and defines itself what is relevant or not in order to predict potential attacks. Further, the prediction model 206 generated using the machine learning techniques and algorithms analyzes the entire content of data files being transferred by the network. Furthermore, the prediction model 206 generated using the machine learning techniques may be content agnostic without requiring substantial modifications or adaptation for analysis, and may analyze raw data in a fully autonomous manner.

In one embodiment, the mode generator 205 trains and updates the prediction model 206 based on, for example, particular aspects of the network traffic data 111, such as, the network data information relating to connection log data, time-window based features (e.g., the number of data packets sent between two ports during a predetermined amount time in milliseconds, seconds, etc.), IP address ranges, server locations, running operating systems (OS), software versions, types of devices, etc. In one embodiment, packet capturing software, ping commands, and traceroute commands are utilized to capture the connection log data at the one or more communication gateways 109. Further, the connection log data relating to network communication between the ground systems 114 (shown in FIG. 1) and cockpit line-replaceable units (LRU) on the aircraft 101 may include cockpit LRU port numbers, channel numbers, etc. Further, the connection log data may include text, voice, and audio message information between the ground systems 114 (e.g., user system 117) and the LRUs.

In one embodiment, the anomaly detection module 207 is configured to retrieve or receive the prediction model 206 from the model generator 205. Further, the anomaly detection module 207 may be configured to detect anomaly or unknown patterns in the network traffic data 111 by utilizing the prediction model 206. The detection may be performed using the prediction model 206 autonomously without any aid of supplementary analysis in a remote server. The detection may be performed within milliseconds. Since data contents cannot be accessed at the network level, threat detection and monitoring is based on packet routing details. That is, the prediction model 206 finds or identifies anomaly patterns or behaviors in the network based on the packet routing details and prevents forwarding potentially hazardous incoming packets to the connected aircraft network 102. Further, the prediction model 206 may also find or identify threats in encrypted traffic, without the need for decryption, using network analytics and machine learning on packet metadata information. In one embodiment, the prediction model 206 may detect or identify threats in application level data by utilizing the prediction model 206 trained using deep learning techniques on text, audio, image, and video data. For example, when a message in an air traffic controller is corrupted or misused, the prediction model 206 may utilize natural language processing to validate or discard the data packets or initiate a request to resend the data packets.

In one embodiment, the anomaly detection system 207 may send the detected known and/or unknown abnormal patterns to the monitor interface 209. Alternatively or additionally, the anomaly detection system 209 may generate alert signals and detection report or automatically discard packets determined to be anomalous. In one embodiment, an end-user (e.g., cyber security agent or teams) monitoring the monitor interface 209 updates the newly identified unknown patterns to a rule-based prevention system (e.g., the intrusion prevention system 119). In another embodiment, an end-user monitoring the monitor interface 209 validates whether a detected anomaly or abnormal pattern is indeed an anomaly or abnormal pattern, and labels the corresponding network data accordingly (e.g., as malicious or benign). Alternatively or additionally, the anomaly detection system 207 may automatically update the intrusion prevention system 119 when unknown patterns are identified.

Figure 3:
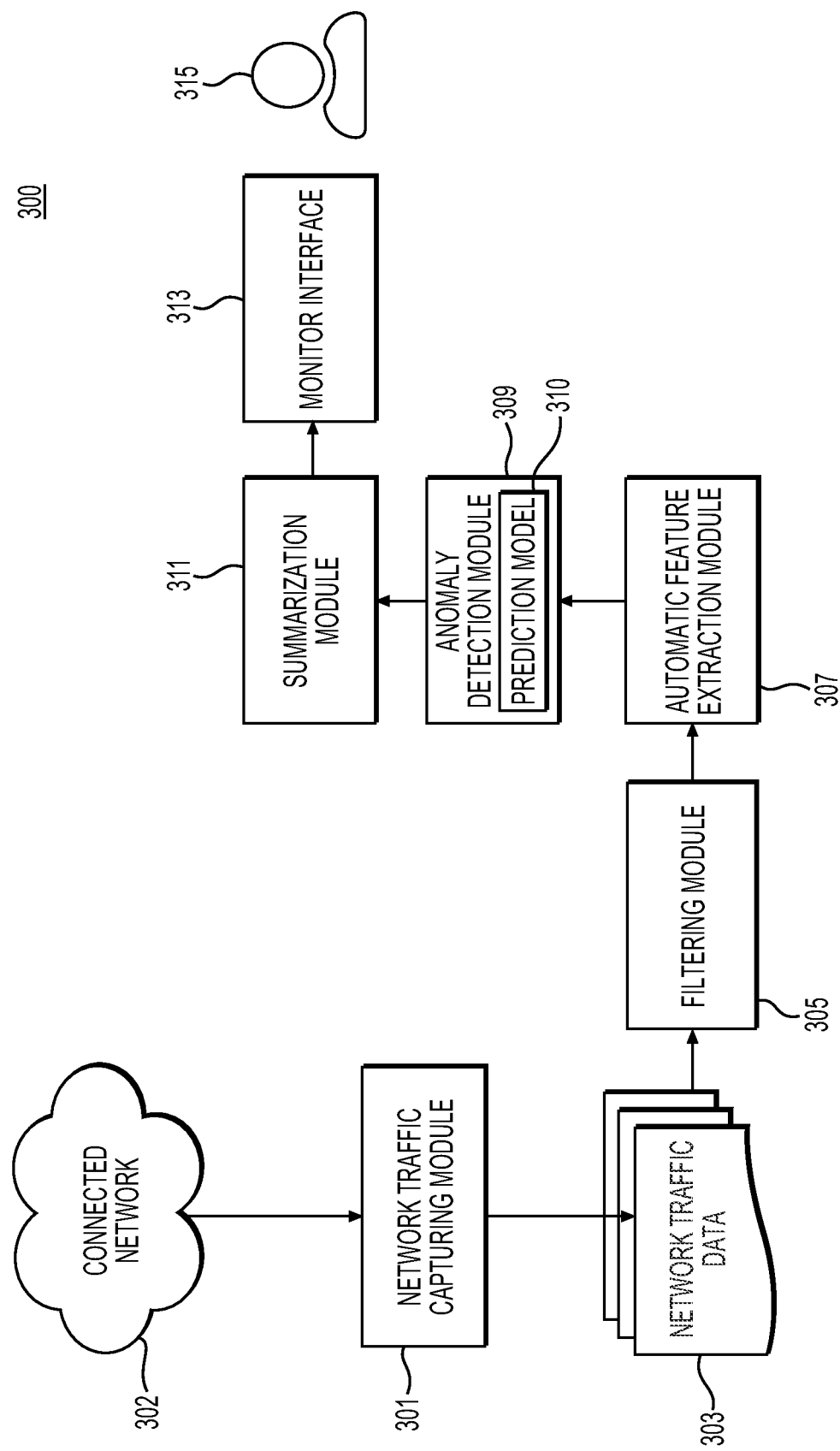
FIG. 3 depicts a block diagram schematically showing an exemplary anomaly detection system, according to one or more embodiments

FIG. 3 shows an exemplary anomaly detection system 300, according to one or more embodiments. In one embodiment, the anomaly detection system 300 includes a connected network 302. The connected network 302 may include the connected aircraft network 102, other connected vehicle (e.g., motor vehicle, railway vehicle, railway vehicle, watercraft, spacecraft, etc.), and/or a device or system capable of communicating network data. Further, the anomaly detection system 300 may include a network traffic capturing module 301 that captures network traffic data 303 from the connected network 302. The anomaly detection system 300 may also include a filtering module 305. The filtering module 305 may filter the network traffic data 303 and transmit the filtered network traffic data 303 to an automatic feature extraction module 307. The automatic feature extraction module 307 may extract certain features in the filtered network traffic data 303 to facilitate building an anomaly prediction model 310 in an anomaly detection module 309. The anomaly detection module 309 may include a learning-based prediction model 310. Further, one or more of the filtering module 305, automatic feature extraction module 307, and the anomaly detection module 309 may be connected to or implemented on a cloud network (not shown), and the prediction model 310 may be trained based on the filtered and feature-extracted network traffic data 303 using machine learning techniques on the cloud network. In one embodiment, the anomaly prediction model 310 is updated in real-time (i.e., continuously) or periodically based on a predetermined time interval.

In one embodiment, the anomaly detection module 309 including the prediction model 310 may be deployed to a user system 117. Alternatively, the trained prediction model 310 may be separately deployed or downloaded to the user system 117. The user system 117 may include smartphones, tablets, personal computers, laptops, network gateways, Internet Service Providers (ISP), communication gateways on vehicles, etc. The anomaly detection module 309 may analyze the network traffic data 303 using the prediction model 310, and identify known and unknown data patterns in the network traffic data 303. In one embodiment, the anomaly detection module 309 may transmit the identified known and unknown data patterns to a summarization module 311. The summarization module 311 may classify the known and unknown data patterns of the network traffic data 303 into different types and/or levels of threat. By classifying the types of treat or malware in real-time, cyber security teams gain immediate visibility and knowledge of the threats or malware that attacks the systems or networks. Such immediate visibility and knowledge provides a better understanding of the impact cyberattacks have on the systems and networks.

The summarization module 311 may transmit the classified known and unknown data patterns of the network traffic data 303 to a monitor interface 313. An end-user 315 (e.g., cybersecurity agent or team) may manually add the newly identified unknown patterns to a rule-based system (e.g., intrusion prevention system 119). In one embodiment, the anomaly detection module 309 may automatically determine which data packets of incoming network data to discard and which data packets to allow to and from the connected network 302. Additionally, the anomaly detection module 309 may automatically update the rule-based intrusion prevention system 119 based on the detected unknown anomaly patterns. The components, devices, and modules of the system 300 may include physical circuitry and processors that may be interconnected via wired connections, wireless connections, or a combination of wired and wireless connections.

Figure 4:
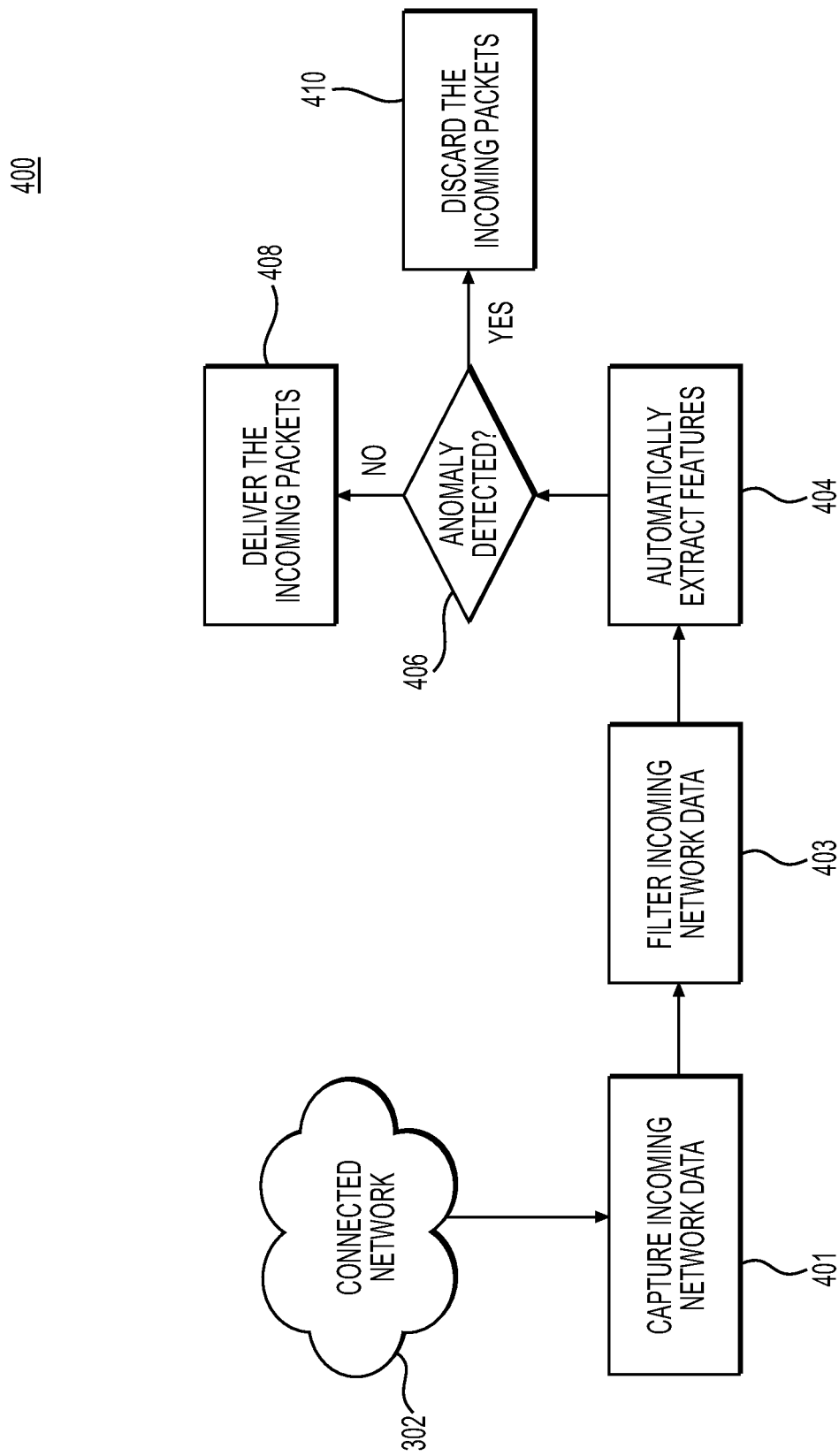
FIG. 4 depicts a flowchart of an exemplary method of performing an automatic cyberattack prevention, according to one aspect of the present disclosure.

FIG. 4 depicts a flowchart of an exemplary method of performing an automatic cyberattack prevention. In particular, method 400 may be performed by the system 300. In step 401, the network traffic capturing module 301 may capture incoming network data from the connected network 302. The incoming network data may include network data packets. In step 403, the filter module 305 may filter the incoming network data received from the network traffic capturing module 301. In step 404, the automatic feature extraction module 307 may extract various features (e.g., cockpit communication data, passenger Hypertext Transfer Protocol Secure (HTTPS) data, cockpit Voice communication data, etc.) of the incoming network data. In step 406, the anomaly detection module 310 may detect an anomaly in the incoming network data based on the extracted features of the incoming network data using the prediction model 310. If the prediction model identifies or detects an anomaly, the anomaly detection module 309 may discard the incoming packets of the network data associated with the detected anomaly at step 410. However, if the prediction model 310 does not detect any anomaly in the incoming packets of the network data, the anomaly detection module 309 may deliver the incoming packets of the network data to an end-user system at step 408 (e.g. user system 117 as shown in FIG. 1).

Figure 5:
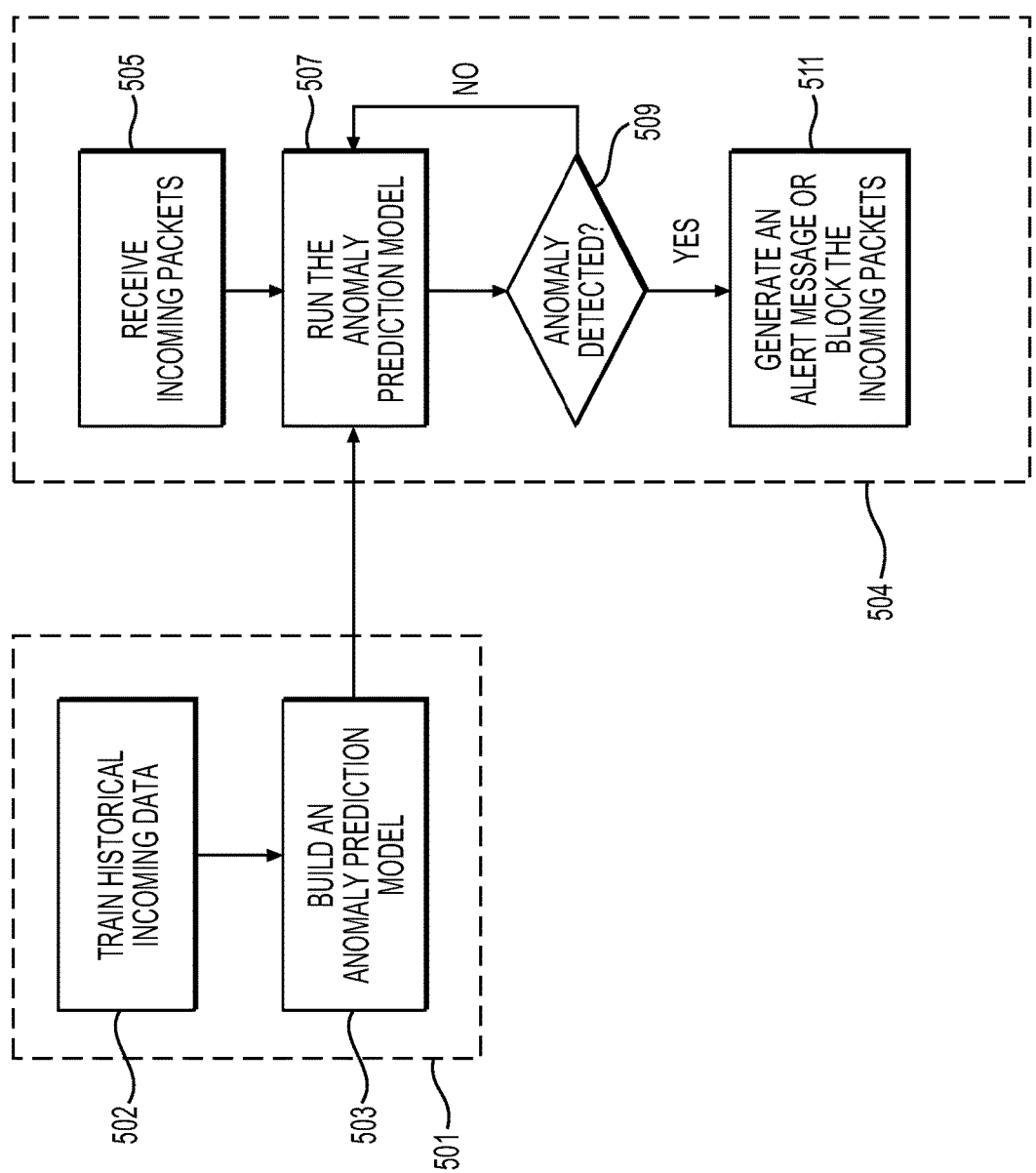
FIG. 5 depicts a flowchart of an exemplary method of training, generating, and using a cloud-based learning model for detecting an anomaly in network traffic data, according to one aspect of the present disclosure.

FIG. 5 depicts a flowchart of an exemplary method of training and generating a cloud-based learning model (e.g., anomaly prediction model) for detecting an anomaly in network traffic data. Method 500 may be performed by a model generator 501 and an end user system 504. Notably, the method 500 illustrates a process of deploying and running the anomaly prediction model in the end-user system 504. In step 502, a model generator 501 (e.g., model generator 205 shown FIG. 2) may facilitate model training using historical connection log data of network traffic data that may be provided from a feature extraction module (e.g., automatic feature extraction module 307 in FIG. 3). Further, the model generator 501 may be connected to or implemented on a cloud network (e.g., cloud network 201 in FIG. 2). In one embodiment, the anomaly prediction model is trained on the cloud network using the machine learning techniques based on the historical connection log data. The sampled or extracted connection log data may contain labeled malicious and/or benign files or records. The sampled connection log data may be filtered and normalized by a filtering module (e.g., filtering module 305) to expedite the training. In step 503, the model generator 501 may, for example, build an anomaly prediction model (e.g., prediction model 206 or 310) using the machine learning techniques. The generated anomaly prediction model may then be deployed to the end-user system 504.

The anomaly prediction model may be downloaded manually or automatically to the end-user system 504 by a user using a wired or wireless method. Additionally or alternatively, the anomaly prediction model may be stored on a server or a cloud. The end-user system 504 may include a connected vehicle monitoring device, a server, a smartphone, a tablet, a laptop, a personal computer, or any other device capable of sending and receiving network data. In step 505, the end-user system 504 may receive incoming data from a network. In step 507, the end-user system 504 may run the anomaly prediction model, which has been received from the model generator 501, to monitor the received incoming packets. In step 509, if the anomaly prediction model detects an anomaly in the received incoming packets, the end-user system 504 may generate an alert message or automatically block the incoming packets in step 511. If the anomaly prediction model does not detect an anomaly in step 509, the end-user system 504 may accept the incoming packets for further processing and routing to appropriate destinations. Further, the end-user system 504 may continue to run the anomaly prediction model in real-time to continuously monitor the incoming packets.

Figure 6:
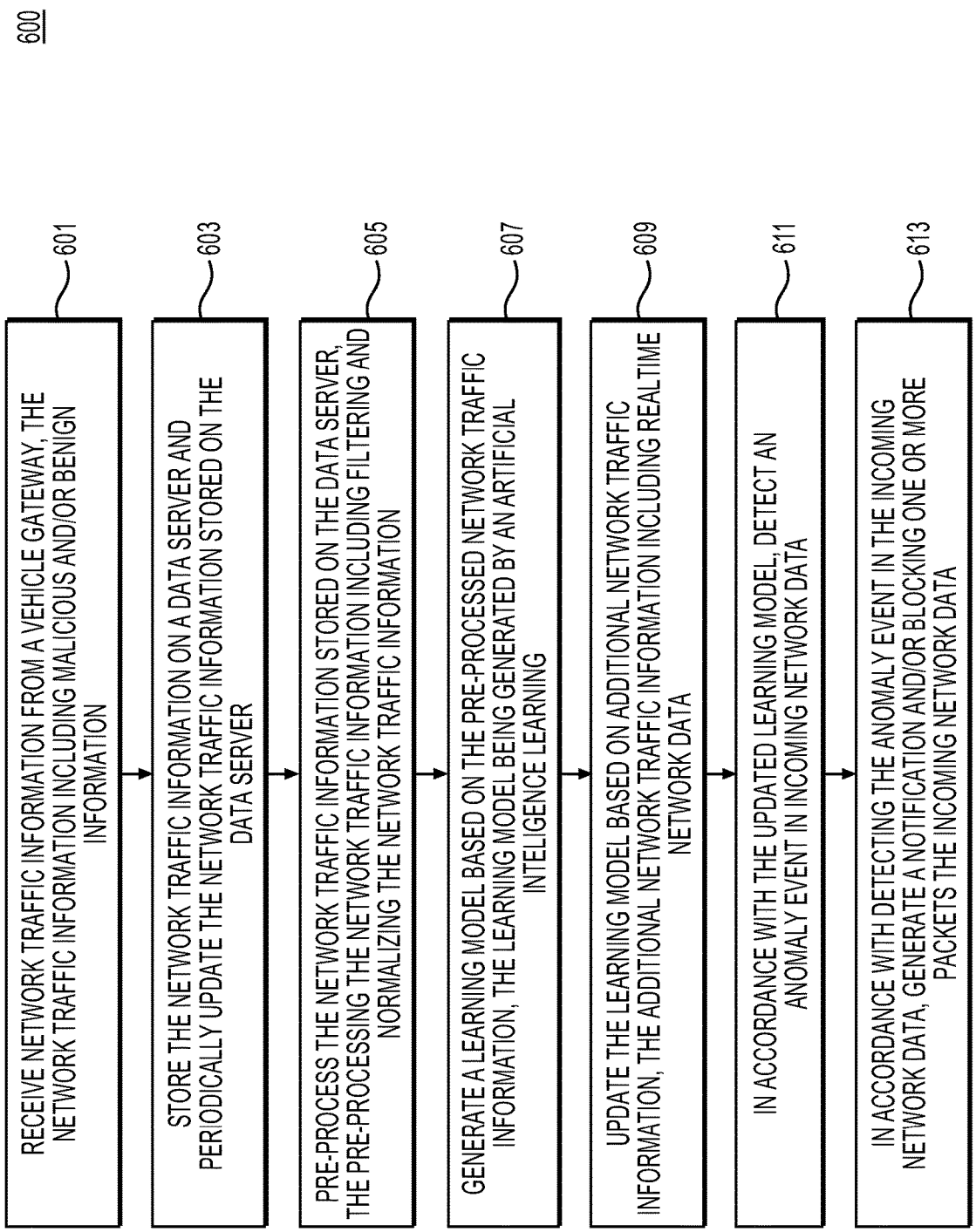
FIG. 6 depicts a flowchart of an exemplary method of monitoring network traffic of a connected vehicle using a cloud-based learning model.

FIG. 6 depicts a flowchart of an exemplary method of monitoring network traffic of a connected vehicle using a cloud-based learning model. Notably, method 600 illustrates an overall flow of model building and utilization, based on a combination of certain processes explained above in reference to FIGS. 1-5. Also, the method 600 may be performed by the intrusion detection system 115. In step 601, the intrusion detection system 115 may receive network traffic information from a vehicle gateway. The network traffic information may include malicious and/or benign information. The vehicle gateway may be a connected aircraft communication gateway. In step 603, the intrusion detection system 115 may store the network traffic information on a data server and periodically update the network traffic information stored on the data server. The data server may be located on a cloud or on a location remote from the intrusion detection system. In step 605 the intrusion detection system may pre-process the network traffic information stored on the data server. The network traffic information may be pre-processed by filtering and normalizing the network traffic information.

In step 607, the intrusion detection system 115 may generate a learning model based on the pre-processed network traffic information. The learning model may be generated by an artificial intelligence learning (e.g., machine learning). In one embodiment, the learning model is generated and stored on a cloud network. Additionally or alternatively, the learning model may be deployed on a user device. Further, the learning model may be deployed by manually or automatically downloading the model onto the user device. Furthermore, the learning model may be accessed and utilized from the cloud network by the user device. In one embodiment, in accordance with the learning model, encrypted metadata of the network traffic information may be analyzed without performing decryption, and in accordance with the analyzed encrypted metadata, anomaly patterns may be identified.

In step 609, the intrusion detection system 115 may update the learning model based on additional network traffic information. In one embodiment, the learning model may be updated based on a predetermined time interval. In one embodiment, the additional network traffic information may include real-time network data. In step 611, in accordance with the updated learning model, the intrusion detection system 115 may detect an anomaly event in incoming network data. In step 613, in accordance with detecting the anomaly event in the real-time network data, the intrusion detection system 115 may generate a notification and/or block one or more packets associated with the incoming network data. The detected anomaly event may be classified based on a predetermined level of threat severity. In one embodiment, in accordance with detecting the anomaly event, the anomaly event is graphically displayed on a display. Further, in accordance with detecting the anomaly event, an origin of the anomaly event may be identified. The origin of the anomaly event may be identified based on the information provided in the historical connections data log (e.g., IP address range, server location, etc.). In one embodiment, the intrusion detection system 115 may use peer to peer communication and distributed validation mechanism (e.g., blockchain) to ensure security intelligence consolidated across multiple devices. Further, the intrusion detection system 115 may apply the learning model on edge devices (e.g., mobile devices) for identifying threats and providing autonomous protection mechanisms based on the edge devices' environments (e.g., mobile devices that may be used in different locations). Thus, the learning model may solve security challenges for mobile devices that may have different security challenges compared to stationary devices (e.g., home or office devices and systems).

In general, any process discussed in this disclosure that is understood to be computer-implementable, such as the processes shown in FIGS. 4-5 and the processes described in connection with FIGS. 1-3, may be performed by one or more processors of a computer system, such as the ground systems 114, the communication gateways 109, and/or the anomaly detection system 300, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as the passenger devices 103, cabin devices 105, crew devices 102, communication gateways 109, intrusion detection system 115, intrusion prevention system 119, user system 117, may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 7:
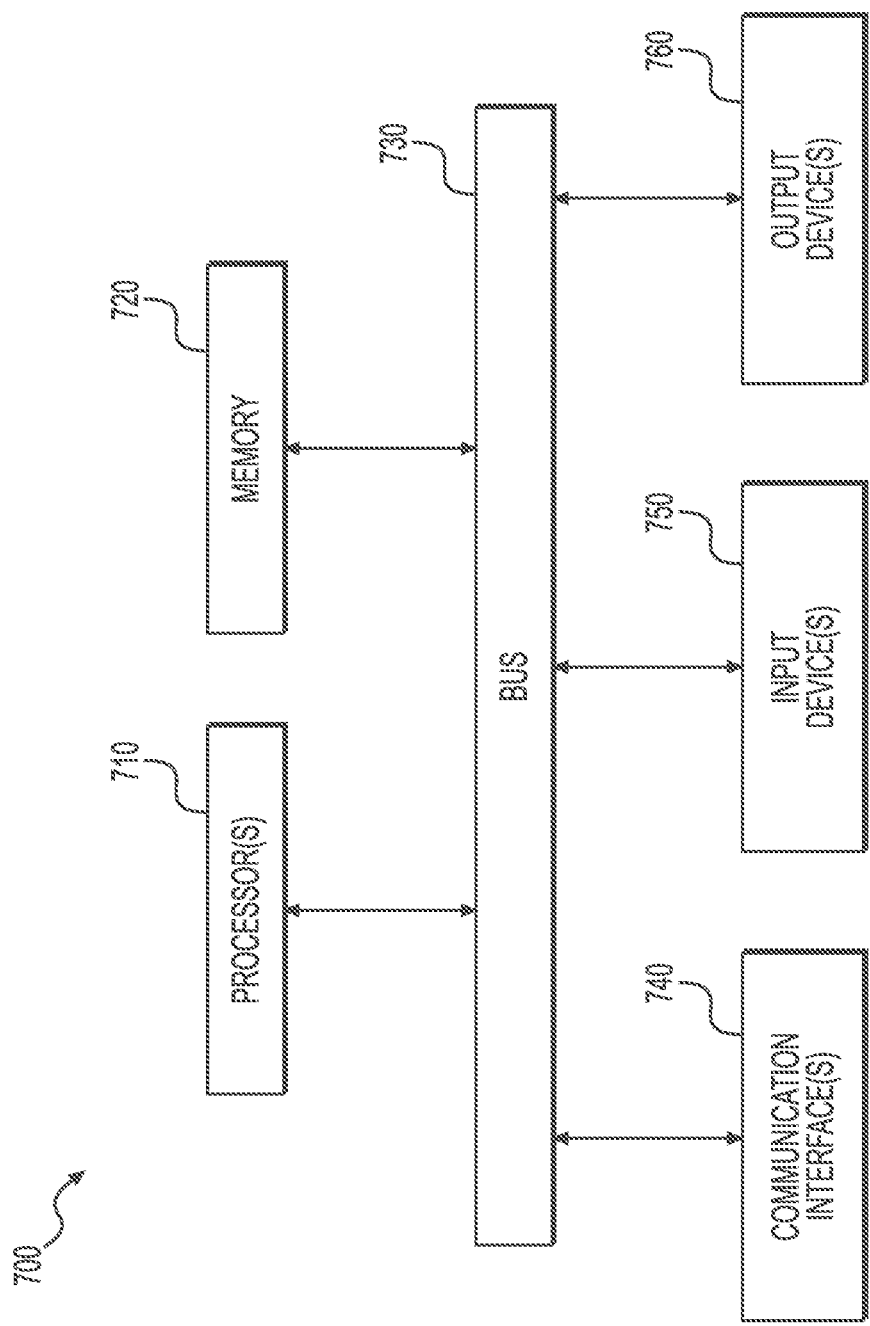
FIG. 7 depicts a computer system that may execute the techniques disclosed herein, according to one or more embodiments.

FIG. 7 illustrates an example of a computing device 700 of a computer system. The computing device 700 may include processor(s) 710 (e.g., CPU, GPU, or other processing unit), a memory 720, and communication interface(s) 740 (e.g., a network interface) to communicate with other devices. Memory 720 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 720. The computing device 700 may, in some embodiments, further include input device(s) 750 (e.g., a keyboard, mouse, or touchscreen) and output device(s) 760 (e.g., a display, printer). For example, if the user system 117 includes a tablet computer, the user system 117 may have a touchscreen and a display. The aforementioned elements of the computing device 700 may be connected to one another through a bus 730, which represents one or more busses. In some embodiments, the processor(s) 710 of the computing device 700 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various aspects of the disclosure. This method of disclosure, however, is not to be interpreted as reflecting an intention that any disclosed embodiment requires more features than are expressly recited in each claim. Rather, as the following claims reflect, inventive aspects may lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method of monitoring network traffic of a connected vehicle, the method comprising:
   receiving network traffic information from a vehicle gateway, the network traffic information including malicious and/or benign information;
   storing the network traffic information on a data server and periodically updating the network traffic information stored on the data server;
   pre-processing the network traffic information stored on the data server, the pre-processing the network traffic information including filtering and normalizing the network traffic information;
   generating a learning model based on the pre-processed network traffic information, the learning model being generated by an artificial intelligence learning;
   updating the learning model based on additional network traffic information, the additional network traffic information including real-time network data;
   in accordance with the updated learning model, detecting an anomaly event in incoming network data; and
   in accordance with detecting the anomaly event in the incoming network data, generating a notification and/or blocking one or more packets associated with the incoming network data.

2. The method of claim 1, further comprising:
   classifying the anomaly event based on a predetermined level of threat severity.

3. The method of claim 1, further comprising:
   deploying the learning model on a user device, wherein the learning model is deployed by manually or automatically loading the learning model onto the user device.

4. The method of claim 1, further comprising:
   generating the learning model on a cloud network; and
   updating the learning model based on a predetermined time interval.

5. The method of claim 1, further comprising:
   in accordance with the learning model, analyzing encrypted metadata of the network traffic information without performing decryption; and
   in accordance with the analyzed encrypted metadata, identifying at least one anomaly pattern.

6. The method of claim 1, further comprising:
   in accordance with detecting the anomaly event, displaying the anomaly event on a display.

7. The method of claim 1, further comprising:
   in accordance with detecting the anomaly event, identifying an origin of the anomaly event.

8. A computer system for monitoring network traffic of a connected vehicle, the system comprising:
   a memory storing instructions; and
   one or more processors configured to execute the instructions to perform operations including:

receiving network traffic information from a vehicle gateway, the network traffic information including malicious and/or benign information;

storing the network traffic information on a data server and periodically updating the network traffic information stored on the data server;

pre-processing the network traffic information stored on the data server, the pre-processing the network traffic information including filtering and normalizing the network traffic information;

generating a learning model based on the pre-processed network traffic information, the learning model being generated by an artificial intelligence learning;

updating the learning model based on additional network traffic information, the additional network traffic information including real-time network data;

in accordance with the updated learning model, detecting an anomaly event in incoming network data; and in accordance with detecting the anomaly event in the incoming network data, generating a notification and/or blocking one or more packets associated with the incoming network data.

9. The system of claim 8, wherein the one or more processor configured to execute the instructions to perform operations further including:

classifying the anomaly event based on a predetermined level of threat severity.

10. The system of claim 8, wherein the one or more processor configured to execute the instructions to perform operations further including:

deploying the learning model on a user device, wherein the learning model is deployed by manually or automatically loading the learning model onto the user device.

11. The system of claim 8, wherein the one or more processor configured to execute the instructions to perform operations further including:

generating the learning model on a cloud network; and updating the learning model based on a predetermined time interval.

12. The system of claim 8, wherein the one or more processor configured to execute the instructions to perform operations further including:

in accordance with the learning model, analyzing encrypted metadata of the network traffic information without performing decryption; and in accordance with the analyzed encrypted metadata, identifying at least one anomaly pattern.

13. The system of claim 8, wherein the one or more processor configured to execute the instructions to perform operations further including:

in accordance with detecting the anomaly event, displaying the anomaly event on a display.

14. The system of claim 8, wherein the one or more processor configured to execute the instructions to perform operations further including:

in accordance with detecting the anomaly event, identifying an origin of the anomaly event.

15. A non-transitory computer-readable medium storing instructions that, when executed by one or more processors of a computer system, cause the computer system to perform a method of monitoring network traffic of a connected vehicle, the method comprising:

receiving network traffic information from a vehicle gateway, the network traffic information including malicious and/or benign information;

storing the network traffic information on a data server and periodically updating the network traffic information stored on the data server;

pre-processing the network traffic information stored on the data server, the pre-processing the network traffic information including filtering and normalizing the network traffic information;

generating a learning model based on the pre-processed network traffic information, the learning model being generated by an artificial intelligence learning;

updating the learning model based on additional network traffic information, the additional network traffic information including real-time network data;

in accordance with the updated learning model, detecting an anomaly event in incoming network data; and in accordance with detecting the anomaly event in the incoming network data, generating a notification and/or blocking one or more packets associated with the incoming network data.

16. The non-transitory computer-readable medium of claim 15, wherein the method further comprises:

deploying the learning model on a user device, wherein the learning model is deployed by manually or automatically loading the learning model onto the user device.

17. The non-transitory computer-readable medium of claim 15, wherein the method further comprises:

generating the learning model on a cloud network; and updating the learning model based on a predetermined time interval.

18. The non-transitory computer-readable medium of claim 15, wherein the method further comprises:

in accordance with the learning model, analyzing encrypted metadata of the network traffic information without performing decryption; and in accordance with the analyzed encrypted metadata, identifying at least one anomaly pattern.

19. The non-transitory computer-readable medium of claim 15, wherein the method further comprises:

in accordance with detecting the anomaly event, displaying the anomaly event on a display.

20. The non-transitory computer-readable medium of claim 15, wherein the method further comprises:

in accordance with detecting the anomaly event, identifying an origin of the anomaly event.

* * * * *